(12) United States Patent
Muirhead et al.

(10) Patent No.: US 10,509,424 B2
(45) Date of Patent: Dec. 17, 2019

(54) SWITCH DEVICE

(71) Applicant: DBK David + Baader GmbH, Rülzheim (DE)

(72) Inventors: William Muirhead, Chaiwan (CN); Friedrich Von Der Luehe, Discovery Bay (CN)

(73) Assignee: DBK David + Baader GmbH, Rülzheim (DE)

( * ) Notice: Subject to any disclaimer, the term of this patent is extended or adjusted under 35 U.S.C. 154(b) by 0 days.

(21) Appl. No.: 16/078,090

(22) PCT Filed: Feb. 22, 2017

(86) PCT No.: PCT/EP2017/053978
§ 371 (c)(1),
(2) Date: Aug. 21, 2018

(87) PCT Pub. No.: WO2017/144490
PCT Pub. Date: Aug. 31, 2017

(65) Prior Publication Data
US 2019/0050007 A1  Feb. 14, 2019

(30) Foreign Application Priority Data

Feb. 23, 2016 (DE) .......................... 10 2016 103 177

(51) Int. Cl.
*G05D 23/19* (2006.01)
*H01H 9/16* (2006.01)
(Continued)

(52) U.S. Cl.
CPC .............. *G05D 23/19* (2013.01); *G01K 1/08* (2013.01); *H01H 9/167* (2013.01); *H01H 9/168* (2013.01);
(Continued)

(58) Field of Classification Search
CPC .................................. G05D 23/19; G01K 1/08
See application file for complete search history.

(56) References Cited

U.S. PATENT DOCUMENTS

2009/0103228 A1    4/2009  Elderbaum
2014/0170971 A1*   6/2014  Walsh .................. H04B 5/0031
                                            455/41.1

FOREIGN PATENT DOCUMENTS

AT          408031 B      8/2001
AT          503172 A1     8/2007
(Continued)

OTHER PUBLICATIONS

German Search Report for DE 10 2016 103 177.1 dated Oct. 7, 2016 (21 pages; with English translation).
(Continued)

*Primary Examiner* — Tuan H Nguyen
(74) *Attorney, Agent, or Firm* — Bejin Bieneman PLC

(57) ABSTRACT

Disclosed is a switch device that includes or is formed by a switchgear. Two sensors of the switchgear monitor two measured values and a switch of the switchgear is switched depending on these measured values. The adjustable thresholds for the measured values are displayed on a digital display integrated in the switchgear or arranged on an external input device. Both thresholds are adjusted digitally via the input device. The input device can be a commercially available smartphone with an app or a laptop.

17 Claims, 2 Drawing Sheets

Figure 1:
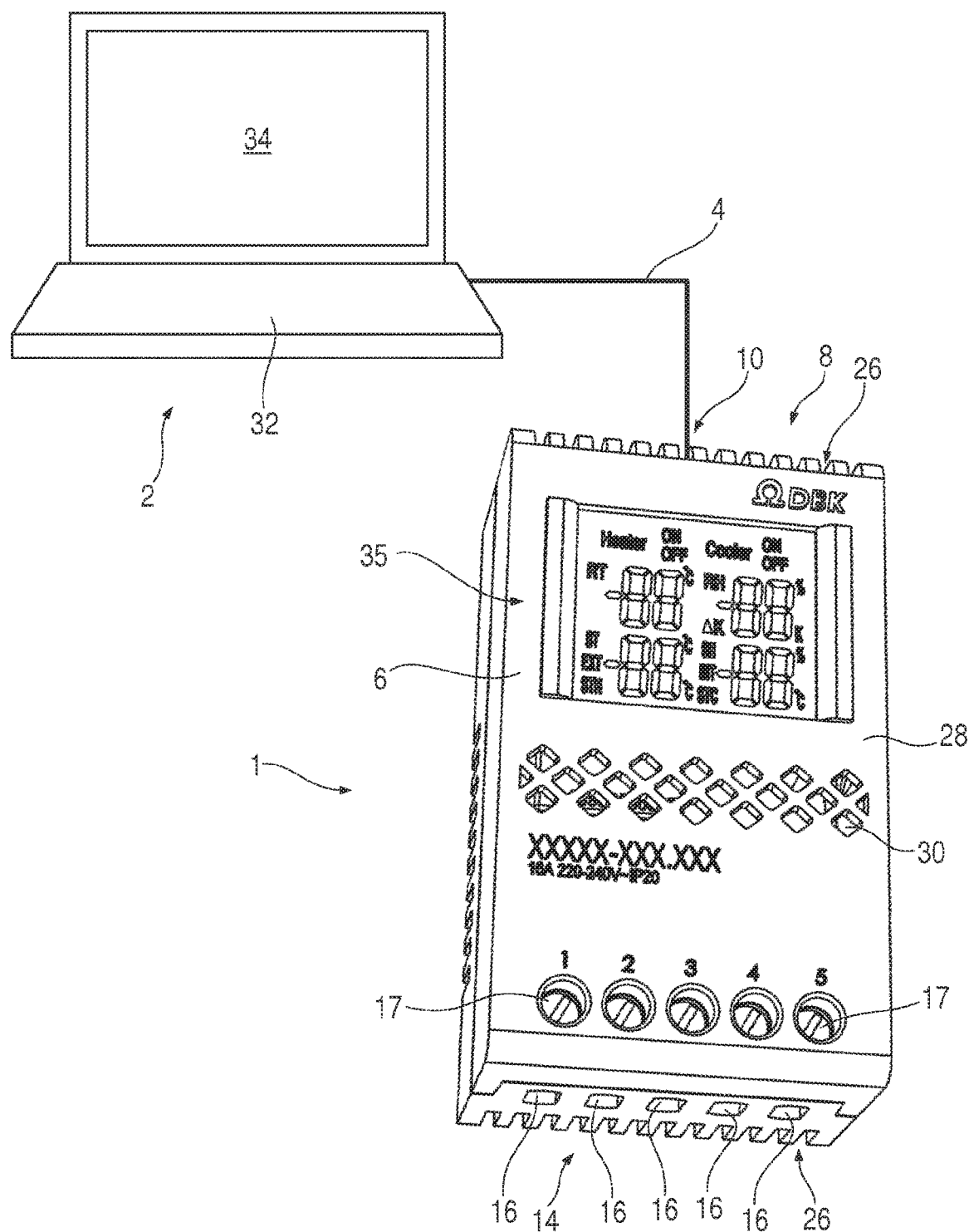

(51) Int. Cl.
*H01H 69/01* (2006.01)
*G01K 1/08* (2006.01)
*H01H 37/04* (2006.01)
*H02B 1/052* (2006.01)
*H02H 3/05* (2006.01)
*H01H 61/00* (2006.01)

(52) U.S. Cl.
CPC ............ *H01H 37/04* (2013.01); *H01H 69/01* (2013.01); *H02B 1/052* (2013.01); *H02H 3/05* (2013.01); *H01H 61/00* (2013.01); *H01H 2300/032* (2013.01); *Y02B 90/224* (2013.01); *Y04S 20/14* (2013.01)

(56) References Cited

FOREIGN PATENT DOCUMENTS

| | | |
|---|---|---|
| DE | 19628364 C1 | 3/1998 |
| DE | 202005005832 U1 | 6/2005 |
| DE | 102013111925 A1 | 4/2015 |
| EP | 1724541 A1 | 11/2006 |

OTHER PUBLICATIONS

International Search Report and Written Opinion for PCT/EP2017/053978 dated May 16, 2017 (with English translation; 10 pages).
http://www.stego.de/de/produkte/regeln/regler/hygrotherm.html (English translation provided; accessed on Jul. 11, 2018 at https://www.stego.de/us/products/regulating/regulators/electronic-hygrotherm).

* cited by examiner

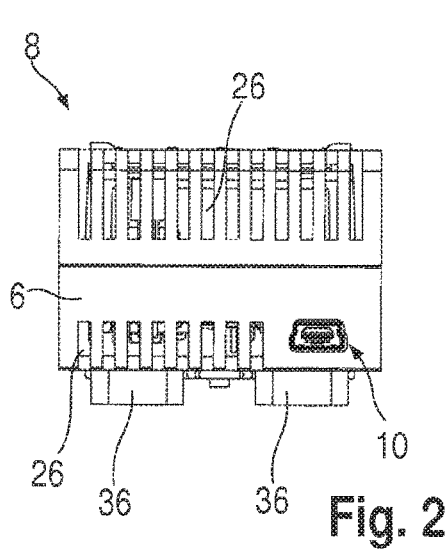
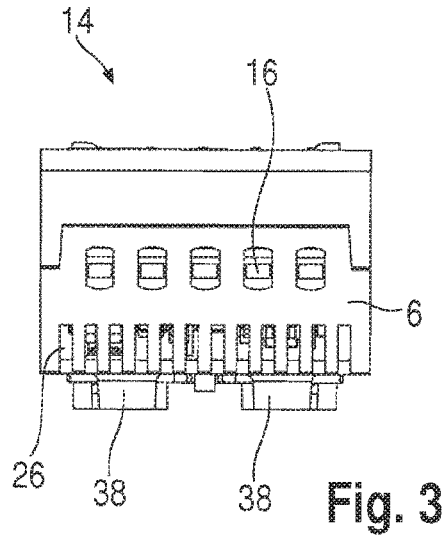
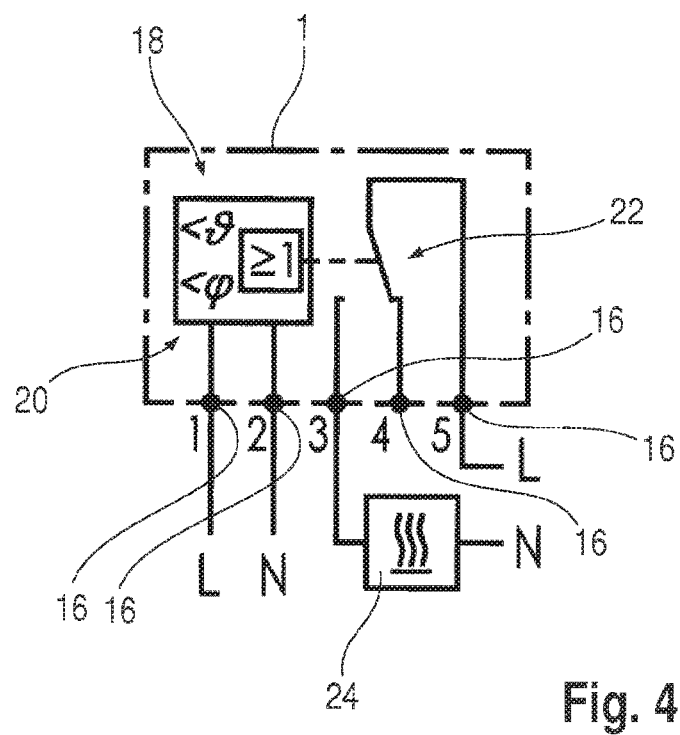

SWITCH DEVICE

CROSS-REFERENCE TO RELATED APPLICATIONS

This application is a national stage of, and claims priority to, Patent Cooperation Treaty Application No. PCT/EP2017/053978, filed on Feb. 22, 2017, which application claims priority to German Application No. DE 10 2016 103 177.1, filed on Feb. 23, 2016, which applications are hereby incorporated herein by reference in their entireties.

DESCRIPTION

The disclosure relates to an electric switch device, e.g. a thermostat or a hygrostat.

Electric switch devices are known which close an electric contact depending on one or more measurement parameters and later open it again. A common example is a thermostat that switches the power supply of a heater on and off depending on a measured temperature (e.g. an iron or an oven). Furthermore, hygrostats are known which switch an electric contact depending on a measured relative humidity.

The disclosure in particular relates to a thermostat or a hygrostat, which is used in switchboards, in which, e.g., programmable logic controllers (PLC) are installed. In this case, the temperature or relative humidity in the switchboard is monitored. Electrical loads connected via the thermostat or hygrostat, such as a heater or a fan, are thus operated if necessary to return the measured temperature or humidity back into a target range. This prevents condensation from forming on the electric or electronic components in the switchboard.

DE 196 28 364 C1 discloses a threshold switch whose thresholds can be freely configured and input—within predefined limits. The threshold switch has an input unit and a display unit.

DE 10 2013 111 925 A1 discloses a combination of two thermostats in one housing, wherein a heater is connected to the first thermostat and a fan is connected to the other thermostat. This allows the heater to be switched on when the temperature falls below a lower permissible temperature and the fan to be switched on when an upper permissible temperature is exceeded.

An example switch device which is a combination of thermostat and hygrostat is the Elektronischer Hygrotherm EFT 012 from STEGO ELEKTRONIK GmbH, located at Kolpingstrasse 21, 74523 Schwaebisch Hall, Germany. The exactly one switch of the switch device is switched as soon as either the measured temperature or the measured relative humidity reaches the respective threshold.

The latter two switch devices have rotary controls for manually setting the thresholds at which the switch device is indented to switch. The disadvantage of this is that such rotary controls are freely accessible and can be adjusted at will. For example, it is possible that a person performing adjustment or service on a programmable logic control located in the switchboard to be air-conditioned adjusts the rotary control to deactivate the heater or fan during their work. In the worst case, the person forgets to readjust the rotary control. In a more favorable case, the person readjusts the rotary control to about the previous threshold. It is furthermore disadvantageous that the adjusted threshold can only be read and adjusted with great inaccuracy. This inaccuracy is increased by the significant hysteresis such rotary controls possess.

In contrast to this, the disclosure is based on the object of creating a switch device in which the aforementioned disadvantages are eliminated or at least reduced.

This object is solved by a switch device with the features described herein.

The switch device has a switchgear which has at least one sensor for determining a respective measured value and an electric switch. The switch is automatically switched depending on the at least one measured value when a respective adjustable threshold is reached. According to the disclosure, the at least one threshold can only be transferred to the switchgear via an electronic interface, and it can be displayed on an electronic digital display. This means that the at least one adjusted threshold cannot be changed at will by unauthorized persons. Furthermore, the threshold can be read and adjusted with high accuracy.

The switch device is particularly convenient to operate, since the at least one threshold can be adjusted with a separate input unit, e.g. an input device, spaced apart from the switchgear. According to the disclosure, this input unit can only be connected to the switchgear via the interface, so that the threshold can only be transferred to the switchgear via the interface.

Preferably, the switch device has exactly one switch to supply exactly one load. Preferably, the switchgear is accommodated in a housing with the switch and the at least one sensor. The display is preferably an LCD display.

Further advantageous embodiments of the disclosure are described herein.

Based on the electronic design of the switch device, it is also advantageously possible to program the at least one threshold. In particular, the at least one threshold at which the switch is switched can be programmed depending on one or more conditions or time.

In a preferred further development, the at least one threshold can be stored permanently in the switch device or in the switchgear even in the event of a power failure.

Preferably, a possible error can be detected by the switchgear and a corresponding signal can be transmitted to the input unit via the interface, so that it issues an optical or acoustic error alarm.

It is especially preferred if the input device is a smartphone or a computer, e.g. a laptop or a tablet. For easy handling, especially on the smartphone, the at least one threshold can be adjustable and readable via an app. If required, the at least one measured value can also be read via the app. If required, the error alarm is also output via the app.

In another variation, the input unit is assigned to or integrated in a programmable logic controller (PLC). The programmable logic controller is stored in a switchboard whose temperature and/or relative humidity is regulated by the switch device.

The display can be provided on the housing of the switchgear or on a housing of the input device.

In an informative further development, the at least one currently measured value and/or the current switching status of the switch can also be shown on the display.

The switch device according to the disclosure can also have two displays, so that the at least one threshold and possibly also the at least one measured value and/or the switching state is shown on the display on the housing of the switchgear on one hand, and on the display on the housing of the input unit on the other hand.

For reasons of compatibility, the interface can be based on a Local Area Network (LAN).

Operating the switch device is particularly convenient if the interface is based on wireless data transmission. For reasons of compatibility, Bluetooth or Wireless Local Area Network (WLAN) is preferred.

A USB interface is particularly preferred. A mini USB connector is preferably provided on the switchgear in this case.

If a thermostat or a hygrostat is arranged in the switchgear, the switch device is particularly suitable for monitoring, e.g. a switchboard. Preferably, thermostat and hygrostat are provided together in the switchgear. For this purpose, a sensor for determining the temperature and a sensor for determining the relative-humidity are provided in the switchgear. Furthermore, a threshold for the temperature and a threshold for the relative humidity, both of which are shown on the display, have to be adjusted or programmed accordingly. The switch device is particularly well suited for air conditioning, e.g. of a switchboard, as it monitors the two climate-relevant measured values. Preferably, the display shows or respectively the two displays show also the currently measured temperature and the currently measured relative humidity. In switch devices with a thermostat and a hygrostat and with the rotary controls known from the prior art, adjustment inaccuracies of up to 15° K and 10% relative humidity occur. The electronic digital switch device according to the disclosure with a thermostat and a hygrostat has significantly improved adjustment accuracies of about 6° K and 5% relative humidity.

In a preferred further development, the housing of the switchgear is designed in such a way that it can be attached to a rail. The rail is preferably DIN standardized.

According to the disclosure, a switchboard has the rail—especially with DIN standard—to which the switchgear of an aforementioned switch device is attached. The switchboard contains a heater or fan connected to the switchgear.

An embodiment of the switch device according to the disclosure is shown in the Figures.

FIG. 1 shows the embodiment of the switch device according to the disclosure in one view, FIG. 2 shows a view of the upper end face of the switchgear of the switch device of FIG. 1, FIG. 3 shows a view of the lower end face of the switchgear of the switch device of FIG. 1 and FIG. 4 shows a schematic of the switchgear of the previous Figures.

FIG. 1 shows the embodiment of the switch device according to the disclosure. It has a switchgear 1 and a commercially available laptop 2, which are connected via a USB cable 4. The switchgear 1 has an essentially cuboid housing 6, with a mini USB connector 10 (not shown in more detail in FIG. 1) provided at its upper end face 8.

The switchgear 1 has five numbered electrical connections 16 at its lower end face 14. The electrical connections 16 are provided as entries for cables or litz wires. They are screw-fastened by means of so-called paternoster clamps, whereby they are screwed through access openings 17 without removing a cover.

FIG. 4 shows a schematic of switchgear 1. A combination of a thermostat 18 and a hygrostat 20 is provided inside of it, wherein the switchgear is also called "hygrotherm". The two electrical connections 16 with the numbers 1 and 2 are used to supply the thermostat 18 and the hygrostat 20. An adjustable threshold is stored in the thermostat 18 and the hygrostat 20, respectively. Via a temperature sensor and a sensor for relative humidity, a respective currently measured value $\vartheta$, $\varphi$ is regularly determined. As soon as one of the two currently measured values $\vartheta$, $\varphi$ reaches the assigned threshold, a switch 22 is switched, whereby the two electrical connections 16 with numbers 3 and 5 are connected to each other. This supplies power to an electric heater 24 and heats the ambient air of switchgear 1, thus reducing the relative humidity. As soon as the concerned measured value $\vartheta$, $\varphi$ falls below the adjusted threshold again, the switch 22 is switched back to the position shown in FIG. 4, whereby the heater 24 is switched off. Instead of the heater shown in FIG. 4, one or more other electrical loads, for example fans, can also be switched.

FIG. 1 shows respective ventilation slots 26 at the upper end face 8 and at the lower end face 14 of the housing 6. Moreover, through recesses 30 are also provided at a front side 28 of the housing 6 so that the thermostat 18 and the hygrostat 20 or respectively the switchgear 1 can react to changes in the ambient air as quickly as possible.

The adjustment of the thresholds for temperature and relative humidity are input via a keyboard 32 of the laptop 2 and shown on a display 34 of the laptop as well as on a display 35 of switchgear 1. Furthermore, the currently measured value $\vartheta$ of the temperature and the currently measured value $\varphi$ of the relative humidity are also displayed on both displays 34, 35. Finally, the state of the switch 22 (cf. FIG. 4) is shown on both displays 34, 35.

Data is exchanged bidirectionally between the laptop 2 and the switchgear 1 via a USB interface of which only the USB cable 4 is shown in FIG. 1.

FIG. 2 shows the upper end face 8 of the housing 6 of the switchgear 1. The large number of ventilation slots 26 and the mini USB connector 10 is shown into which a plug of the USB cable 4 (cf. FIG. 1) can be inserted.

Furthermore, FIG. 2 shows two clip elements 36 formed in one piece with the housing 6, both of which can encompass a common side of a DIN-standard top-hat rail (not shown), with which the housing 6 of the switchgear can be fastened in a switchboard equipped with the corresponding rail.

FIG. 3 shows with a view to the lower end face 14 of the housing 6, two further clip elements 38 formed in one piece with the housing 6, which are opposite to those of FIG. 2 and can thus encompass the top-hat rail (not shown) on their opposite side.

In a preferred case of application, the switchboard contains a programmable logic controller (PLC) whose electronic and electric elements are protected from the formation of condensate from the ambient air by the switch device according to the disclosure.

As was already explained in the introduction of the description, as an alternative to the embodiment shown, a smartphone can be provided as input unit instead of the laptop 2, and/or a wireless data transfer via Bluetooth instead of USB cable 4. A corresponding app is then installed on the smartphone.

Disclosed is a switch device that includes or is formed by a switchgear. Two sensors of the switchgear monitor two measured values, and a switch of the switchgear is switched depending on these measured values. The adjustable thresholds for the measured values are displayed on a digital display integrated in the switchgear or arranged on an external input device. Both thresholds are adjusted digitally via the input device. The input device can be a commercially available smartphone with an app or a laptop.

LIST OF REFERENCE NUMBERS 1 switchgear
2 laptop
4 USB cable
6 housing 8 upper end face
10 mini USB connector
14 lower end face
16 electrical connection
17 access opening
18 thermostat
20 hygrostat
22 switch
24 heater
26 ventilation slot
28 front side
30 through recess
32 keyboard
34 display
35 display
36 clip element
38 clip element
ϑ measured value of the temperature
φ measured value of the relative humidity

The invention claimed is:

1. A switch device comprising a switchgear, the switchgear comprising:
   a sensor for determining at least one measured value; and
   a switch which can be switched when the at least one measured value reaches a respective adjustable threshold; wherein:
   the threshold can be displayed on a digital display and can only be transferred to the switchgear via an interface;
   a separate input unit is provided, at which the threshold can be adjusted, and from which the threshold can be transferred to the switchgear via the interface;
   the digital display is provided at the switchgear; and
   the switch is electric, wherein the at least one measured value determined by the sensor can be displayed on the digital display provided at the switchgear.

2. The switch device according to claim 1, wherein the threshold can be programmed.

3. The switch device according to claim 1, wherein the threshold can be permanently stored in the switchgear.

4. The switch device according to claim 3, wherein a housing of the switchgear is formed such that it can be fastened to a rail.

5. The switch device according to claim 1, wherein the input unit is a computer or a smartphone.

6. The switch device according to claim 5, wherein a further display is provided at the input unit.

7. The switch device according to claim 5, wherein the interface is based on wireless data transfer.

8. The switch device according to claim 5, wherein the interface is a universal serial bus interface.

9. The switch device according to claim 5, wherein a thermostat and/or a hygrostat is/are arranged in the switchgear.

10. The switch device according to claim 5, wherein a housing of the switchgear is formed such that it can be fastened to a rail.

11. The switch device according to claim 1, wherein a further display is provided at the input unit.

12. The switch device according to claim 1, wherein a switching state of the switch can be displayed on the digital display.

13. The switch device according to claim 1, wherein the interface is based on a local area network.

14. The switch device according to claim 1, wherein the interface is based on wireless data transfer.

15. The switch device according to claim 1, wherein the interface is a universal serial bus interface.

16. The switch device according to claim 1, wherein a thermostat and/or a hygrostat is/are arranged in the switchgear.

17. The switch device according to claim 1, wherein a housing of the switchgear is formed such that it can be fastened to a rail.

* * * * *